Patented May 3, 1932

1,856,131

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AMINO DERIVATIVE OF 4-HYDROXY DIPHENYL

No Drawing. Original application filed October 11, 1928, Serial No. 311,976. Divided and this application filed December 6, 1929. Serial No. 412,293.

In the well known process for the manufacture of phenol, wherein chlorbenzene is hydrolyzed with caustic soda solution under pressure at a temperature of 350° to 390° C., about five per cent. of tarry residue is obtained from the purification still. Such residue has been found to contain a high proportion of 4-hydroxy-diphenyl, or para-phenyl-phenol, together with a lesser amount of the isomeric ortho-compound. The aforesaid hydroxy-diphenyl compounds have hitherto been prepared only in the laboratory and with much difficulty, so have remained merely chemical curiosities without practical significance.

In a previous application, Serial No. 311,976, filed October 11, 1928, of which this is a division, I have described new and useful derivatives of 4-hydroxy-diphenyl and claimed the chloro-hydroxy-diphenyls. In another application, Serial No. 412,292, filed December 6, 1929, also a division of the above, I have claimed halo-alkoxy-diphenyls. In the present application, I shall claim other new and useful compounds derived from the above-mentioned 4-hydroxy-diphenyl, particularly amino-alkoxy-diphenyls, as well as useful and novel methods for the preparation thereof.

To the accomplishment of the foregoing and related ends, the invention, then, consists of the methods and products hereinafter fully described and particularly pointed out in the claims, such methods and products, however, constituting but several of the ways and products, respectively, in which the principle of the invention may be exemplified.

I have found that the aforesaid 4-hydroxy-diphenyl may be halogenated under suitably controlled conditions whereby the mono-, di-, or higher halogenated derivatives are obtained. I am aware that bromo derivatives have previously been prepared, as well as certain nitro and amino derivatives. However, none of the compounds obtained by chlorinating 4-hydroxy-diphenyl have been described in the literature.

I have further found that an amino group may be substituted for halogen in the halogenated derivatives when such derivatives are heated under pressure with aqueous ammonia in the presence of a cuprous compound as catalyst. Such amino-derivatives, in turn, may be diazotized and coupled with various cyclic amino or phenolic compounds thereby forming valuable dyes. Likewise, the alkyl ethers of 4-hydroxy-diphenyl, and of the above-mentioned derivatives thereof, may be prepared by treating with alkylating agents in the usual way.

Representative compounds of the several types in question, as well as suitable methods for the preparation thereof, are described in the following examples:

1. 3-chlor-4-hydroxy-diphenyl.

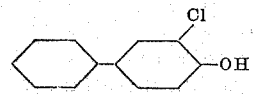

One mole 4-hydroxy-diphenyl is dissolved in one mole caustic soda and six liters water, the solution cooled and a solution containing one mole sodium hypochlorite added slowly with constant stirring. The reaction mixture is allowed to stand for about one hour, then warmed to about 40° C., filtered and, after cooling, 3-chloro-4-hydroxy-diphenyl precipitated from the filtrate with hydrochloric acid. Fine colorless crystals, M. P. 77° C.

2. 3-chlor-4-methoxy-diphenyl.

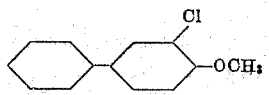

An alkaline solution of 3-chloro-4-hydroxy-diphenyl is treated with one and one-eighth moles of methyl sulphate, with stirring. The methyl ether precipitates out. To complete the reaction the mixture is warmed to 50° to 60° C. for about one-half hour, then cooled and 3-chloro-4-methoxy-diphenyl filtered therefrom. Fine colorless crystals, M. P. 91° to 92° C.

3. 3-brom-4-methoxy-diphenyl.

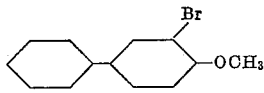

Formed by similar method to (1) and (2). Fine colorless crystals, M. P. 61° to 63° C.

4. 3-amino-4-methoxy-diphenyl.

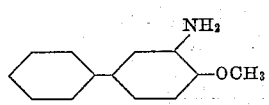

One mole of the 3-chlor compound is heated under pressure with five moles aqueous ammonia and one-half mole cuprous oxide at a temperature of 200° to 220° C. for 15 hours with thorough agitation. The reaction product is dissolved in a solvent immiscible with water such as benzene, ether, etc., and extracted therefrom with dilute mineral acid. The HCl salt is sparingly soluble in water, from which it crystallizes in colorless needles. The pure amino base is precipitated from the solution of its salt by treatment with an alkali. Colorless crystals, M. P. 79° C.

The foregoing specific examples are merely illustrative of certain convenient methods of procedure for the preparation of the general classes of compounds herein referred to. While in some of the examples the formation of a methyl ether is described, it is equally feasible to prepare an ethyl or other alkyl ether by the use of an appropriate alkylating agent. Furthermore, I do not limit myself to the specific reagents as stated in the examples, for other related compounds in certain cases are adapted to the type of reaction in question and may be used, if desired, to prepare products of the above general description. For example, instead of sodium hypochlorite as chlorinating agent, I may use calcium, or other hypochlorite, or chlorine gas. For the formation of a mono-chlor derivative, a hypochlorite solution is to be preferred, whereas with chlorine directly the tendency is toward the production of di- or higher chlorinated derivatives. Likewise brominated derivatives may be made by employing the corresponding brominating agents. While methyl sulphate is specifically referred to in the example, I may use other methylating, or alkylating, agents such as a methyl or alkyl halide. It is also evident that, in some cases at least, the sequence of operations may be varied without change in the end-product obtained.

In the following claims, the term "halogenating" is means to refer to either "chlorinating" or "brominating"; and the term "hypohalite" to "hypochlorite" or "hypobromite".

Other modes of applying the principle of the invention may be employed instead of the one explained, change being made as regards the method herein disclosed, provided the steps or ingredients stated by any of the following claims, or the equivalent of such be employed.

I therefore particularly point out and distinctly claim as my invention:—

1. The method of making an amino-4-alkoxy-diphenyl which comprises reacting 4-hydroxy-diphenyl with a halogenating agent, alkylating the hydroxy group, and reacting the so formed halogenated 4-alkoxy-diphenyl with ammonia.

2. The method of making an amino-4-alkoxy-diphenyl which comprises reacting 4-hydroxy-diphenyl with a hypohalite, alkylating the hydroxy group, and reacting the so formed halogenated 4-alkoxy-diphenyl with ammonia.

3. The method of making an amino-4-alkoxy-diphenyl which comprises reacting 4-hydroxy-diphenyl with a hypochlorite, alkylating the hydroxy group, and reacting the so formed chlorinated 4-alkoxy-diphenyl with ammonia.

4. The method of making an amino-4-methoxy-diphenyl which comprises reacting 4-hydroxy-diphenyl with a hypochlorite, methylating the hydroxy group with dimethyl sulfate, and reacting the so formed chlorinated 4-methoxy-diphenyl with ammonia.

5. The method of making a 3.4-amino-alkoxy-diphenyl which comprises reacting 4-hydroxy-diphenyl with an aqueous sodium hypochlorite to form 3.4-chloro-hydroxy-diphenyl, alkylating the hydroxy group in the latter, and heating the so formed 3.4-chloro-alkoxy-diphenyl with aqueous ammonia under pressure in the presence of a copper-containing catalyst.

6. The method of making 3.4-amino-methoxy-diphenyl which comprises reacting 4-hydroxy-diphenyl with an equimolecular amount of aqueous sodium hypochlorite to form 3.4-chloro-hydroxy-diphenyl, reacting the latter with dimethyl sulfate in alkaline solution, and heating the so formed 3.4-chloro-methoxy-diphenyl with aqueous ammonia under pressure in the presence of a copper-containing catalyst.

7. The method of making a 3.4-amino-alkoxy-diphenyl, which comprises mono-halogenating 4-hydroxy-diphenyl, alkylating the hydroxyl group, and reacting the so formed 3-halo-4-alkoxy-diphenyl with ammonia.

8. The method of making a 3.4-amino-alkoxy-diphenyl, which comprises mono-chlorinating 4-hydroxy-diphenyl, alkylating the hydroxyl group, and reacting the so formed 3-chloro-4-alkoxy-diphenyl with ammonia.

9. The method of making 3.4-amino-methoxy-diphenyl, which comprises monochlorinating 4-hydroxy-diphenyl methylating the hydroxy group, and reacting the so formed 3-chloro-4-methoxy-diphenyl with ammonia.

10. The method of making an amino-4-alkoxy-diphenyl, which comprises reacting 4-hydroxy-diphenyl with a hypohalite solution to form a mono-halo-derivative, reacting the latter with an alkylating agent, and heating the so formed halogenated 4-alkoxy-diphenyl with aqueous ammonia under pressure in the presence of a copper-containing catalyst.

11. The method of making an amino-4-alkoxy-diphenyl which comprises reacting 4-hydroxy-diphenyl with a hypochlorite solution to form a mono-chloro-derivative, reacting the latter with an alkylating agent, and heating the so formed chlorinated 4-alkoxy-diphenyl with aqueous ammonia under pressure in the presence of cuprous oxide.

12. As a new product, an amino-4-alkoxy-diphenyl preparable by halogenating 4-hydroxy-diphenyl, alkylating the hydroxy group to form a halogenated 4-alkoxy-diphenyl, and reacting the latter with ammonia.

13. As a new product, a 3-amino-4-alkoxy-diphenyl.

14. As a new product, 3.4-amino-methoxy-diphenyl having a melting point of 79° C. and forming colorless crystals.

Signed by me this 29th day of November, 1929.

ERNEST F. GRETHER.